United States Patent
Zheng (10) Patent No.: US 11,057,499 B2
(45) Date of Patent: Jul. 6, 2021

(54) DEVICE CONTROL METHOD BY THIN CLIENT SYSTEM

(71) Applicant: Sino-Japanese Engineering Corporation, Tokyo (JP)

(72) Inventor: Zeyong Zheng, Tokyo (JP)

(73) Assignee: SINO-JAPANESE ENGINEERING CORPORATION, Tokyo (JP)

( * ) Notice: Subject to any disclaimer, the term of this patent is extended or adjusted under 35 U.S.C. 154(b) by 330 days.

(21) Appl. No.: 15/561,460

(22) PCT Filed: Mar. 25, 2015

(86) PCT No.: PCT/JP2015/059214
§ 371 (c)(1),
(2) Date: Sep. 25, 2017

(87) PCT Pub. No.: WO2016/151815
PCT Pub. Date: Sep. 29, 2016

(65) Prior Publication Data
US 2018/0124215 A1 May 3, 2018

(51) Int. Cl.
*H04L 29/06* (2006.01)
*G06F 15/00* (2006.01)
(Continued)

(52) U.S. Cl.
CPC .............. *H04L 67/42* (2013.01); *G06F 15/00* (2013.01); *G06K 7/1413* (2013.01);
(Continued)

(58) Field of Classification Search
CPC ........ G06F 15/00; G06K 7/14; G06K 7/1413; H04L 67/42; H04L 67/10; H04L 67/28; H04L 67/025
See application file for complete search history.

(56) References Cited

U.S. PATENT DOCUMENTS

| 6,732,112 B1 | 5/2004 | Nagatomo et al. |
| 7,779,091 B2 * | 8/2010 | Wilkinson .......... H04L 67/1002 709/220 |

(Continued)

FOREIGN PATENT DOCUMENTS

| CN | 102387279 A | 3/2012 |
| JP | H09-146725 A | 6/1997 |

(Continued)

OTHER PUBLICATIONS

International Search Report for PCT/JP2015/059214, dated Jun. 2, 2015.

(Continued)

*Primary Examiner* — SM A Rahman (57) ABSTRACT

[Problem]

Provided are an information processing system and a terminal capable of realizing device control at the terminal side, with a comparatively simple structure.

[Solving Means]

A terminal 3 is communicably connected to a server 2 and to a device 4 to be controlled, receives information which defines an input interface, from the server 2, presents the input interface to a user on the basis of the received information, receives control information for controlling the device 4 and data to be processed by the device 4 from the server 2, and transmits the received control information and data to the device 4.

3 Claims, 5 Drawing Sheets

(51) Int. Cl.
  *H04L 29/08* (2006.01)
  *H04W 4/80* (2018.01)
  *G06K 7/14* (2006.01)

(52) U.S. Cl.
  CPC ............ *H04L 67/025* (2013.01); *H04L 67/10* (2013.01); *H04L 67/28* (2013.01); *H04W 4/80* (2018.02)

(56) References Cited

U.S. PATENT DOCUMENTS

| | | | | |
|---|---|---|---|---|
| 9,036,178 | B2* | 5/2015 | Norota | G06F 3/121 |
| | | | | 358/1.14 |
| 2005/0081158 | A1* | 4/2005 | Hwang | G06Q 30/02 |
| | | | | 715/740 |
| 2006/0221363 | A1* | 10/2006 | Roth | B41J 3/36 |
| | | | | 358/1.6 |
| 2007/0234229 | A1* | 10/2007 | Ohtsuka | G06T 15/30 |
| | | | | 715/781 |
| 2007/0268824 | A1* | 11/2007 | Kodaka | H04L 29/06027 |
| | | | | 370/229 |
| 2009/0116066 | A1 | 5/2009 | Nishitani | |
| 2011/0276653 | A1* | 11/2011 | Matsui | H04N 19/176 |
| | | | | 709/217 |
| 2012/0019364 | A1* | 1/2012 | Reichenbach | G06K 7/10079 |
| | | | | 340/10.1 |
| 2012/0050793 | A1 | 3/2012 | Miyazawa | |
| 2012/0178431 | A1 | 7/2012 | Gold | |
| 2013/0156100 | A1* | 6/2013 | Matsui | H04N 19/12 |
| | | | | 375/240.07 |
| 2013/0159393 | A1* | 6/2013 | Imai | H04N 21/2662 |
| | | | | 709/203 |
| 2013/0250354 | A1* | 9/2013 | Kato | H04N 1/00225 |
| | | | | 358/1.15 |
| 2013/0275957 | A1* | 10/2013 | Villar | G06F 8/65 |
| | | | | 717/173 |
| 2013/0315493 | A1* | 11/2013 | Sato | G06T 9/007 |
| | | | | 382/232 |
| 2014/0012892 | A1* | 1/2014 | Jaudon | H04L 67/141 |
| | | | | 709/203 |
| 2014/0331144 | A1 | 11/2014 | Kim et al. | |
| 2015/0067494 | A1* | 3/2015 | Hattori | G06F 17/212 |
| | | | | 715/274 |
| 2015/0067819 | A1* | 3/2015 | Shribman | H04L 67/32 |
| | | | | 726/12 |
| 2016/0182762 | A1* | 6/2016 | Eum | H04N 1/4413 |
| | | | | 358/1.14 |
| 2016/0209994 | A1* | 7/2016 | Kaufthal | G06F 8/38 |
| 2016/0337416 | A1* | 11/2016 | Galbraith | G06F 3/0421 |
| 2016/0338120 | A1* | 11/2016 | Boyle | H04L 65/1069 |
| 2017/0221453 | A1* | 8/2017 | Asada | G06F 3/048 |

FOREIGN PATENT DOCUMENTS

| | | |
|---|---|---|
| JP | 2001-232904 A | 8/2001 |
| JP | 2002-063108 A | 2/2002 |
| JP | 3330117 B2 | 9/2002 |
| JP | 2009-015750 A | 1/2009 |
| JP | 2009-199580 A | 9/2009 |
| WO | 98/006037 A1 | 2/1998 |

OTHER PUBLICATIONS

Written Opinion of the International Searching Authority for PCT/JP2015/059214, dated Jun. 2, 2015.
CN Patent Office, Chinese Search Report for Chinese Patent Application No. 2015800776636, dated Jun. 21, 2020.
Japan Patent Office, Office Action for Japanese Patent Application No. 2017-507258, dated Apr. 2, 2019.
European Patent Office, The Extended European Search Report.
Japan Patent Office, Office Action for Japanese Patent Application No. 2020-66115, dated May 11, 2021.

\* cited by examiner

DEVICE CONTROL METHOD BY THIN CLIENT SYSTEM

TECHNICAL FIELD

The present disclosure relates to an information processing system, a terminal, and a program.

BACKGROUND ART

Various devices such as a business-use handy terminal provided with a barcode reader (hereinbelow, simply referred to as a handy terminal), a mobile phone, etc., are controlled by microcomputers. Further, as communication technologies, such as the Internet technology, develop, these various devices are provided with a communication function to have a function of transmitting/receiving data through a network.

For example, a large number of handy terminals have already been used in distribution sites, and these handy terminals transmit data to a center-side apparatus through a network.

PRIOR ARTS

Patent Document
Patent Document 1: Domestic Re-Publication of WO 98/006037

SUMMARY

Problem to be Solved by the Invention

On the other hand, there is a desire of controlling externally connected devices, such as printers, various RFID tag readers/writers, etc., from the terminal-side, such as a handy terminal. However, in general, since there are a large number of terminals, installing applications for controlling the devices on each of the terminals is difficult.

The present disclosure has been created in view of the above. One of the objectives of the present disclosure is to provide an information processing system and a terminal capable of realizing device control at the terminal side with a comparatively simple structure.

Solving Means

In order to solve the above drawbacks, the present disclosure provides an information processing system comprising, a server, a backend apparatus, and a terminal which is communicably connected to the server, and to a device to be control; wherein, the server includes a circuitry configured to receive screen description information relating to an input interface, from the backend apparatus, execute transformation to a data format interpretable for the terminal, on the basis of the received screen description information, transmit the information in the data format interpretable at the terminal side, to the terminal, and receive control information for controlling the device from the backend apparatus, and transmit the received information to the terminal; and the terminal includes a circuitry configured to receive the control information transmitted, through the server, from the backend apparatus, and transmit the received control information to the device.

Also, according to an embodiment of the present disclosure, a terminal is communicably connected to a server and a device to be controlled, the terminal including a circuitry configured to receive information defining an input interface, from the server, and present the input interface to a user, on the basis of the received information, receive control information for controlling the device, and data to be processed by the device, from the server, and execute device communication by transmitting the received control information and the received data to the device.

Further, another embodiment of the present disclosure is a program which makes a computer communicably connected to a server and to a device to be controlled, function to receive information defining an input interface, from the server, and present the input interface to a user, on the basis of the received information, receive control information for controlling the device, and data to be processed by the device, from the server, and execute device communication by transmitting the received control information and the received data to the device.

EMBODIMENT

Figure 1:
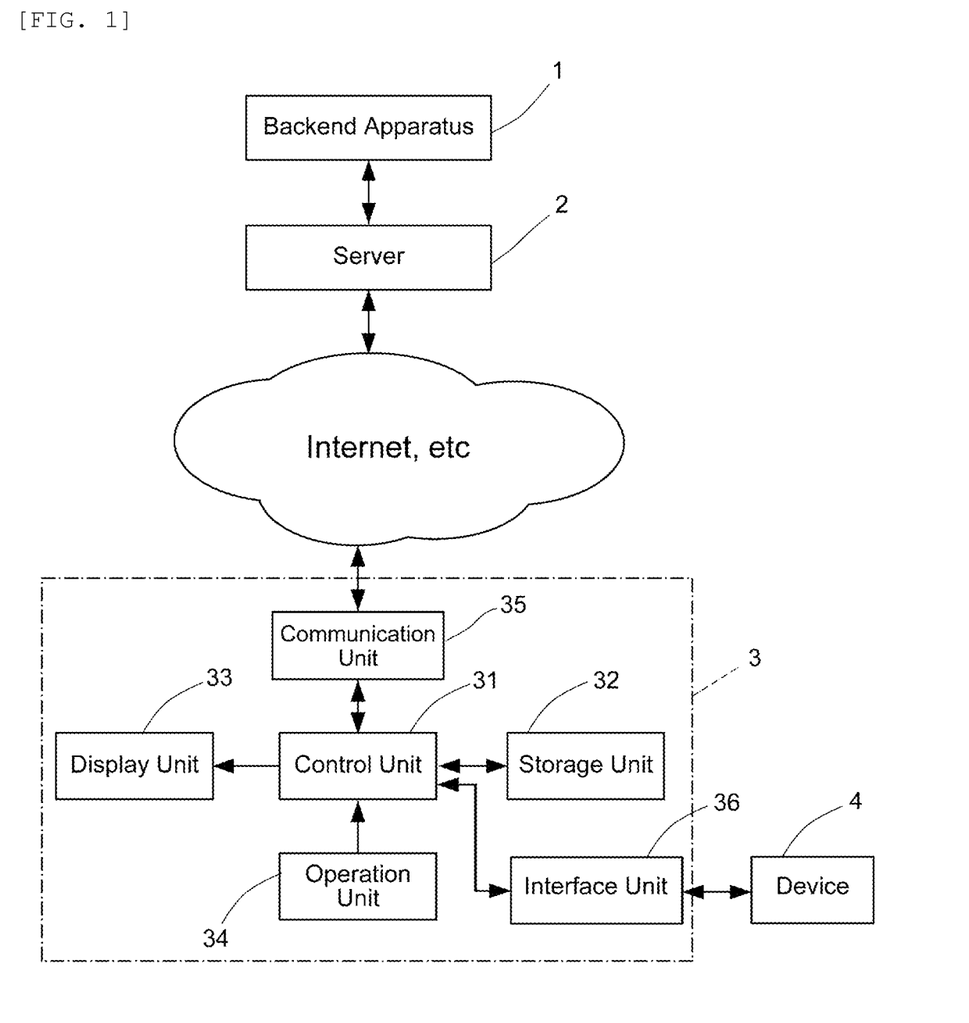
FIG. 1 shows a structural block diagram showing an example of an information processing system according to an embodiment of the present disclosure.

An embodiment of the present disclosure will be explained with reference to the drawings. As shown in FIG. 1, an information processing system according to the present embodiment comprises a backend apparatus 1, a server 2, a terminal 3, and a device 4 such as a printer. Here, only one terminal 3 is shown in FIG. 1 for explanation purposes, but there may be a plurality of terminals 3. The backend apparatus 1 and the server 2 may be connected through a network, or may be integrally mounted on a same computer. The terminal 3 comprises a control unit 31, a storage unit 32, a display unit 33, an operation unit 34, a communication unit 35, and an interface unit 36. The terminal 3 and the server 2 are communicably connected through a network, such as the Internet, etc.

Figure 2:
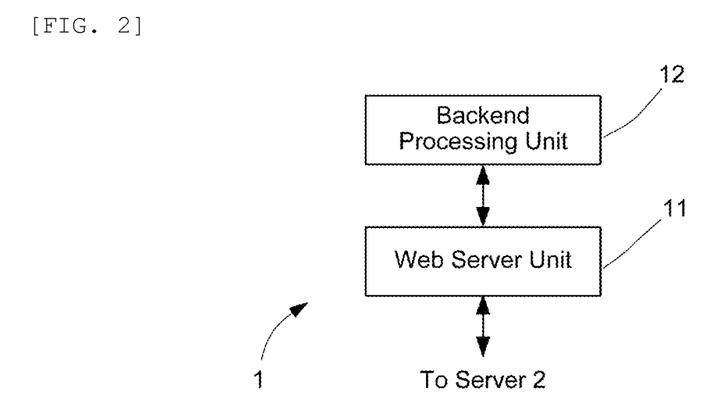
FIG. 2 shows a functional block diagram showing an example of a backend apparatus according to an embodiment of the present disclosure.

The backend apparatus 1 is an ordinary web server, and functionally comprises a web server unit 11, and a backend processing unit 12, as exemplified in FIG. 2. Here, when the web server unit 11 receives a request for delivery information from the server 2, the web server unit 11 outputs the request to the backend processing unit 12. This request is, for example, a request for a web page in HTTP (Hyper Text Transfer Protocol), and the request may include data as a parameter, the data being input to an input field defined by screen description information explained below. Further, in accordance with the instructions input from the backend processing unit 12, the web server unit 11 transmits the delivery information to the server 2, the delivery information including the screen description information which defines appearance, etc., of a user interface to be displayed to a user of the terminal 3. Here, the delivery information is written in, for example, HTML, XML (eXtensible Markup Language), and the like.

According to the present embodiment, the screen description information defines each screen element, such as a character string (text), a button, an input field, etc. Among the screen elements, the element which receives instruction operation by a user (button, input field, menu, etc.) is referred to as an interface component, hereinbelow.

The backend processing unit 12 receives a request for delivery information from the web server unit 11, and outputs the requested delivery information to the web server unit 11. Here, the delivery information may have been previously stored in the storage unit 32, or may be generated by the backend processing unit 12.

As mentioned above, the request for delivery information may include data input at the terminal 3. If the backend processing unit 12 receives a request including such input data, the backend processing unit 12 accepts the data which has been input in relation to an operation guide element included in the delivered screen description information, and executes a process using the data. Specifically, this process is inventory control, shipping control, etc., that is, a process (business logic) realized by a program executed by the backend apparatus 1.

Further, the backend processing unit 12 of the present embodiment may output delivery information including control information for controlling a device 4 (device control information), to the web server unit 11, the delivery information being transmitted to the terminal 3 through the server 2. According to an example of the present embodiment, this device control information includes a control command for controlling a printer, etc., which is a device 4. Further, the delivery information including the device control information, may include data input at the terminal 3, or data generated at the backend processing unit 12, as data to be processed by the device. For example, if the device control information is a control command for controlling a printer, this data is output together with the control command. Then, the data is printed by the printer which is controlled.

The server 2 is an ordinary server computer comprising a CPU, which is a program controlled device, a storage unit, a display unit, etc., and operates in accordance with a previously installed program. The server 2 functionally comprises a client unit 21, and an information transformation unit 22, as exemplified in FIG. 3.

Figure 3:
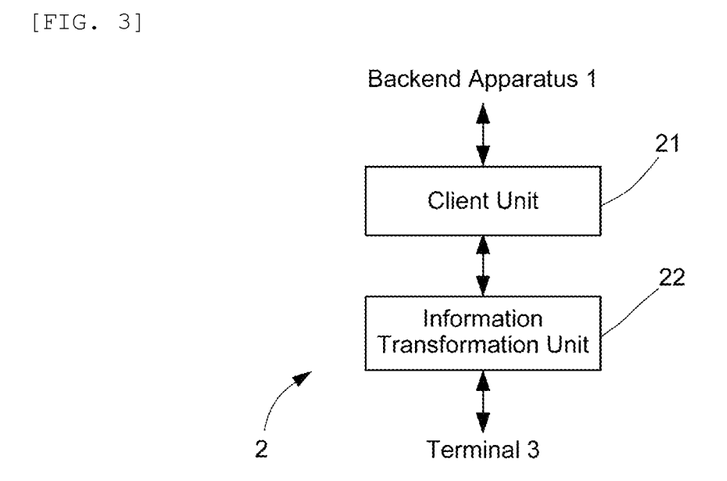
FIG. 3 shows a functional block diagram showing an example of a server according to an embodiment of the present disclosure.

The client unit 21 outputs a request for obtaining the written delivery information with a parameter input from the information transformation unit 22, to the backend apparatus 1. As already mentioned, the request is output together with an URL (Uniform Resource Locators), and is interpreted as a request for delivery information specified by the URL. Further, the client unit 21 receives the delivery information from the backend apparatus 1, and outputs the received delivery information to the information transformation unit 22.

With respect to the delivery information input from the client unit 21, the information transformation unit 22 transforms at least the screen description information included in the delivery information, to a data format which can be interpreted at the terminal 3 side (instruction to the terminal 3). As a specific example, if the screen description information in the delivery information includes a description instructing to display a button (the description including an URL, etc., of delivery information which should be requested when the button is operated), the information transformation unit 22 transforms this screen description information to information in a data format previously determined as being interpretable at the terminal 3 side (referred to as terminal control information).

The data format of this terminal control information is, for example, a series of character strings arranged in a predetermined format. Specifically, with respect to an interface component, type (Type), mode information (mode), size information (size), information relating to a display position ("x", "y"), information relating to displayed character string (text), an URL (url) of delivery information requested in response to the operation, and the like, are written in XML, and arranged (such as "<button mode=aaa size=bbb x=ccc y=ddd buttontype=fff url=ggg.eee</button>", and the like). Here, the information transformation unit 22 can obtain information of the size and the display position regarding the relevant interface component, on the basis of the screen description information.

In addition, when the screen description information includes information indicating a plurality of interface components, the information transformation unit 22 should only arrange the information regarding the relevant interface components in the order of the description. The data in this format is interpreted by the terminal 3 mentioned below, and is subjected to a screen display process and an information input process of the terminal 3.

Further, when the delivery information includes the device control information or data which should be processed by the device, the information transformation unit 22 outputs the terminal control information in which the device control information and the data which should be processed by the device are included as they are.

The control unit 31 of the terminal 3 is a program controlled device such as a CPU, operating in accordance with a program stored in the storage unit 32, interpreting instructions input from the communication unit 35, and controlling each unit in accordance with the instructions. Specific operations of the control unit 31 will be explained in detail below.

The storage unit 32 is a computer-readable information storage medium, such as a RAM (Random Access Memory), a flash memory, etc., which holds a program. Further, the storage unit 32 at least partly contains a readable/writable portion, and functions as a work memory which stores information necessary for the operation of the control unit 31.

The operation unit 34 is a keypad, a barcode reader, etc., which receives input of information by an operation of a user, and outputs the received information to the control unit 31. The display unit 33 is a display which displays information in accordance with the instructions input from the control unit 31. Specifically, the display unit 33 is a dot matrix liquid crystal display, etc., but is not limited thereto. The communication unit 35 is, for example, a wireless LAN interface, etc., which transmits/receives information to/from the server 2, through an access point which can access the server 2 through the Internet. The communication unit 35 outputs instructions received from the server 2, to the control unit 31, and transmits information to the server 2 in accordance with the instruction input from the control unit 31.

The interface unit 36 is, for example, an USB (Universal Serial Bus) interface, a Bluetooth (registered mark) interface, etc., connected to the device 4, and transmits information input from the control unit 31, to the device 4. Further, the interface unit 36 receives information transmitted from the device 4, and outputs the received information to the control unit 31.

Here, the operations of the control unit 31 of the terminal 3 are to be explained. One of the programs executed by the control unit 31 is an interpreter which interprets the terminal control information received from the server 2, and in accordance with the result of the interpretation, controls the display unit 33 to display a character string, etc. As exemplified in FIG. 4, the control unit 31 of the present embodiment functionally comprises an interpreter unit 41, a data input/output unit 42, a data holding unit 43, a device control unit 44, and a device communication unit 45.

Figure 4:
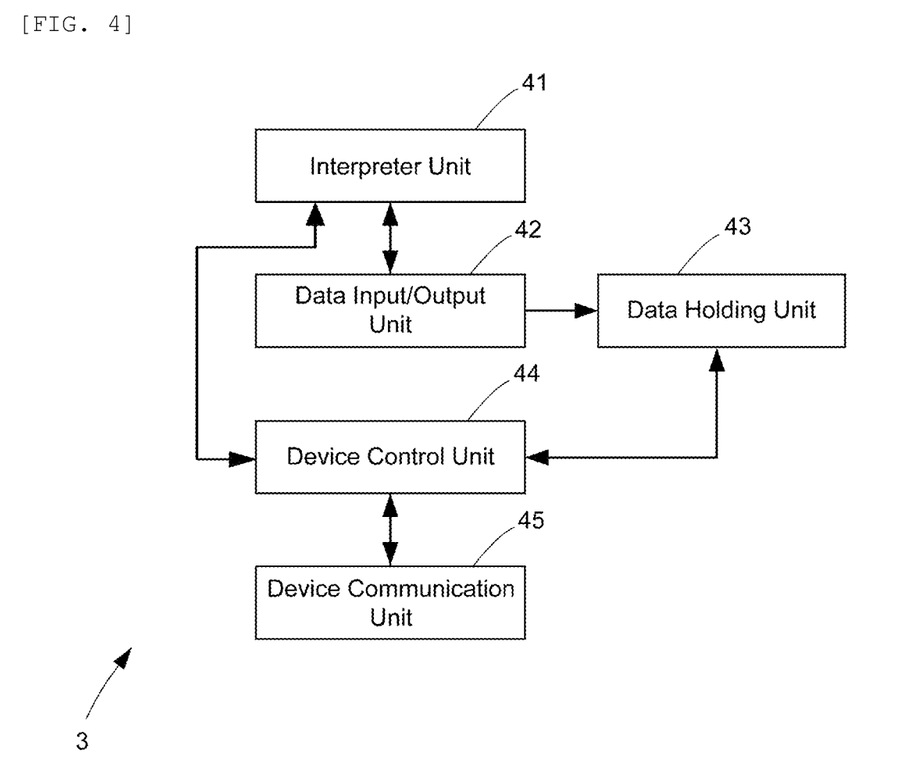
FIG. 4 shows a functional block diagram showing an example of a terminal according to an embodiment of the present disclosure.

Same as the ordinary computer controlled device, the terminal 3 of the present embodiment executes a basic program (BIOS (Basic Input/Output System) or an operating system), and data input/output to/from an externally connected device is executed through the device communication unit 45 (virtual interface) set by the basic program. Namely, a program executed on the terminal 3 outputs information which should be transmitted to the device, to the basic program, and then, the device communication unit 45 realized by the basic program controls the USB controller, etc., to transmit the information to the device. Also, the information received from the device side is received through the device communication unit 45.

The interpreter unit 41 receives the terminal control information generated at the information transformation unit 22 of the server 2, extracts information such as type (Type), mode information (mode), size information (size), information relating to a display position ("x", "y"), information relating to a displayed character string (text), etc., of an interface component, from the terminal control information, and outputs the extracted information to the data input/output unit 42.

In the present embodiment, when the delivery information includes device control information, the interpreter unit 41 outputs the delivery information including the device control information to the device control unit 44. At this time, the interpreter unit 41 may control the display unit 33 to output a predetermined character string (for example, "in printing", etc.).

The data input/output unit 42 generates a display screen on the basis of the information extracted by the interpreter unit 41. Specifically, when information indicating "button" is extracted as a type of an interface component, the data input/output unit 42 refers to size information and display position information which are extracted together therewith, and controls the display unit 33 to display an image of a button. Further, when a user operates the operation unit 34 and inputs data, the data input/output unit 42 receives the input data, and outputs the received data to the data holding unit 43. In an example of the present embodiment, the data input/output unit 42 outputs input values (data) for respective interface components of the input fields by arranging the values in the order of data included in the terminal control information. The data holding unit 43 holds the data output from the data input/output unit 42.

When receiving the input of delivery information including the device control information, from the data input/output unit 42, the device control unit 44 outputs the device control information included in the delivery information through the device communication unit 45 to the device 4. Further, the device control unit 44 may perform a process using data contained in the delivery information together with the device control information. According to an example of the present embodiment, information for controlling a printer is input as the device control information, the input information being initialization, control information at the start of printing such as designation of print position, etc., control information at the end of printing (page brake command, etc.).

Further, the device control unit 44 puts the data, which has been included in the delivery information received from the server, between the control information at the start of printing and the control information at the end of printing. In this data, the device control unit 44 may insert a character string indicating the end of a print line (i.e., CR, LF code), at every predetermined number of characters or every predetermined number of pieces of data.

Specifically, the device control information for controlling the printer, which is input to the device control unit 44, may be written by a widely known printer control command such as ESC/P, etc. In this case, the control information at the start of printing is, for example:

ESC @ (initialize)
ESC 0 (set page break width)
ESC $ a b (set horizontal position of print start, on the basis of a set of parameters a, b).

The control information at the end of printing may be FF (Full Feed) code.

In this example, if the data received with the device control information is, for example, serial numbers from 1 to 100, the device control unit 44 adds the CR, LF command in every 5 pieces of data, such as:

ESC @ (initialize)
ESC 0 (set page break width)
ESC $ a b (set horizontal position of print start, on the basis of a set of parameters a, b)
1, 2, 3, 4, 5 CR LF
6, 7, 8, 9, 10 CR LF
. . .
96, 97, 98, 99, 100 CR LF
FF In this way, the data received from the server 2 is added to the device control information, and the resultant device control information is transmitted through the device communication unit 45, to the device 4.

In addition, when the device control unit 44 receives information, through the device communication unit 45, from the device 4 side to which the device control information (including the case that additional data has been written) has been transmitted, the device control unit 44 generates a request for delivery information including the received information as a parameter, and transmits the generated request for delivery information to the server 2.

The device 4 is a printer, etc., and according to an example of the present embodiment, the device 4 is communicably connected to the terminal 3 through an interface such as USB, or a network. The device 4 receives an input of the device control information from the terminal 3, operates in accordance with the received device control information, and transmits information representing the result of the operation (code indicating the success of the process, error code, etc.) to the terminal 3.

An embodiment of the present disclosure is configured as mentioned above, and operates as described below. In the example described below, the backend apparatus 1 performs processes for inventory control by delivering delivery information P1 and delivery information P2, in response to requests, respectively, the delivery information P1 including instructions to display a field to which a product ID and a quantity are to be input, and the delivery information P2 including instructions to make the printer output data. Specifically, the delivery information P2 has a previously defined <print>tag in which device control information and data to be printed are written. The delivery information P1 includes an instruction to display a button regarding a command to submit data to the backend apparatus 1 (description of a button including a command to submit data when the button is operated). The delivery information P1 further includes an instruction to display a button regarding a command to request printing.

Here, the program executed by the backend apparatus 1 transmits each delivery information in HTTP protocol. Specifically, the program can be written with Java (registered trademark), Java Servlet, as well as a script language such as JavaScript (registered trademark), PHP, ASP (Active Server Pages), and the like.

Figure 5:
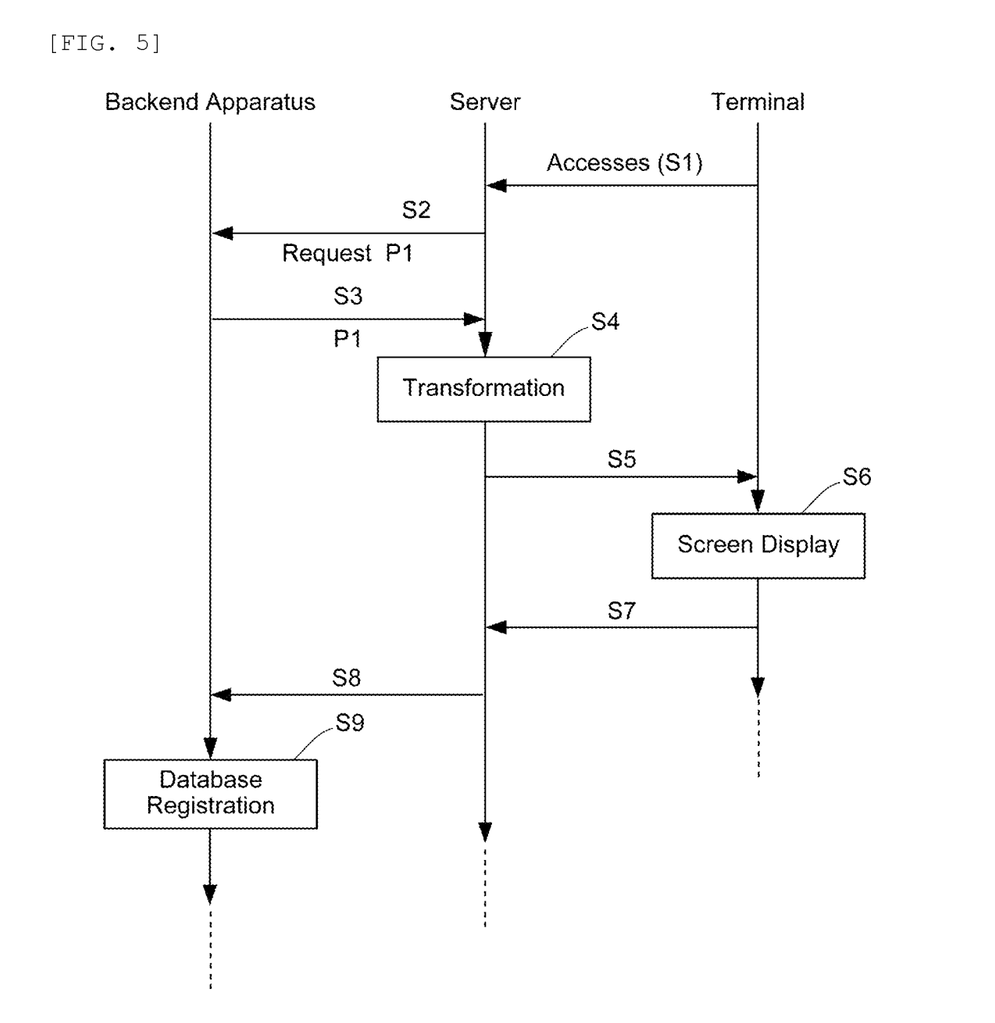
FIG. 5 is a flowchart showing an example of basic operations of the information processing system according to an embodiment of the present disclosure.

When the terminal 3 accesses the server 2, the server 2 transmits the delivery information P1. FIG. 5 shows an example of operations by the information processing system according to the present embodiment. Namely, upon initialization operation, the terminal 3 accesses server 2 (S1), and the server 2 submits a request for acquiring data at a predetermined URL, to the backend apparatus 1 (S2). In response to the data acquisition request, the backend apparatus 1 delivers delivery information P1 specified by the requested URL to the server 2 which is the source of the request (S3).

The HTTP client unit 21 of the server 2 receives the delivery information P1. Then, the server 2 executes operations as the information transformation unit 22 to transform the screen description information included in the delivery information P1 to the terminal control information (S4). The terminal control information includes instructions instructing to display an input field for a product ID and an input field for a quantity, and to accept operations by a user. Each input field may be associated with conditions relating to the operations by the user. For example, the input field for a product ID may be assigned with an operation condition that input with barcode is acceptable, and the input field for a quantity may be assigned with an operation condition that the numerical value selected from 50 to 100 should be input with a keypad. The information transformation unit 22 transmits the terminal control information obtained by the transformation, to the terminal 3 (S5).

The control unit 31 of the terminal 3 receives an input of the terminal control information which has been received by the communication unit 35, interprets the content thereof, and makes the input field for a product ID and the input field for a quantity be displayed at the respective locations on the display unit 33 (S6).

In response to a user's operation, the control unit 31 of the terminal 3 receives an input indicating that a product ID is to be input. Then, the user operates the operation unit 34, which is a barcode reader, to read a barcode of an inventory product, and the data read by the barcode reader (for example, "aaaa") is output to the control unit 31. The control unit 31 controls the storage unit 32 to store the received information, and controls the display unit 33 to display the data in the product ID input field. Then, the control unit 31 moves the cursor to the quantity input field.

Here, if the user inputs, for example, "100", and operates a button instructing to submit the data to the backend apparatus 1, the control unit 31 transmits the URL (URL of a program which accepts the input data) included in the instruction for displaying the button, and a list (parameter list) of input values (product ID and quantity), through the communication unit 35, to the server 2 (S7).

The server 2 transmits a request of data specified by the URL, and the parameter list, to the backend apparatus 1 (S8). Then, in response to the request, the backend apparatus 1 executes a program to receive the data, and performs processes such as storing values indicated by the received parameter list in the database, and the like (S9).

Figure 6:
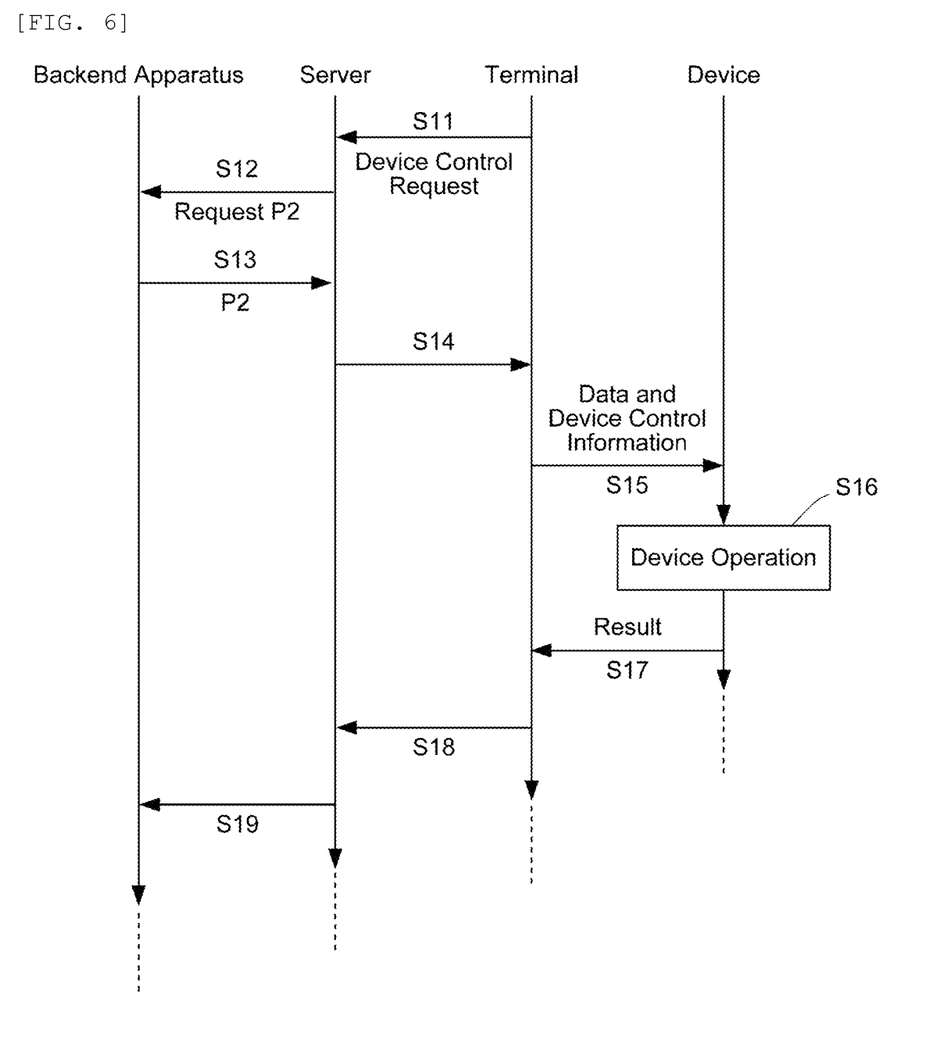
FIG. 6 is a flowchart showing an example of operations of the information processing system according to an embodiment of the present disclosure.

Further, performance when a user operates the terminal 3, and operates a button instructing to request printing, will be explained with reference to FIG. 6. In this case, the control unit 31 of the terminal 3 transmits the URL (URL of the delivery information P2 including the device control information) included in the instruction to display the button, and the list (parameter list) of input values (product ID and quantity), through the communication unit 35, to the server 2 (S11). The server 2 transmits a request of the data specified by the URL, and the parameter list, to the backend apparatus 1 side (S12). Then, the backend apparatus 1 performs processes such as storing the values indicated by the received parameter list in the database, etc., and in response to the request of the data, delivers the delivery information P2 corresponding to the received URL, to the server 2, i.e., the source of the request (S13).

The HTTP client unit 21 of the server 2 receives the delivery information P2. Then, the server 2 executes operations as the information transformation unit 22. Here, the delivery information P2 includes device control information, and thus, the server 2 transmits the delivery information P2 including the device control information, as it is, to the terminal (S14).

The control unit 31 of the terminal 3 receives the input of the delivery information P2 (here, the device control information and the data are included) which has been received by the communication unit 35, and examines the content of the delivery information P2. In this case, the received delivery information P2 includes the device control information, and thus, the control unit 31 functions as the device control unit 44 and transmits the device control information to the device 4 (S15).

Specifically, in case that the device control information included in the delivery information P2 received from the server 2 includes commands to start printing, such as ESC @ (initialize)
ESC 0 (set page break width)
ESC $ a b (set horizontal position of print start, on the basis of a set of parameters a, b), the control unit 31 adds, subsequent thereto, data (for example, the list of the product ID and the quantity) included in the delivery information P2, such as aaaa, 100 CR LF and further, adds a command to stop printing,

FF in the device control information included in the delivery information P2 received from the server 2, and then, the control unit 31 transmits the resultant information to the device 4.

The device 4, i.e., a printer, accepts the device control information (with added data) transmitted from the terminal 3. Then, in accordance with the instructions described in the accepted device control information, the printer initializes the printer, sets a page break width, feeds a piece of paper, and sets a print start position, and thereafter, the printer prints the data which is character strings representing the product ID and the quantity, i.e., "aaaa, 100", on the piece of paper, inserts a page break, and discharges the printed paper (S16).

Then, the printer transmits information indicating completion of printing to the terminal 3 (S17). The terminal 3 accepts the information, generates a request for delivery information which includes the information indicating the completion of printing as a parameter, and transmits the generated request for delivery information to the server 2 (S18). Here, the request for delivery information (URL) to be transmitted may be associated with the device control information and recorded in the delivery information P2, or may be set in advance as an URL which should be designated when a result is notified.

The server 2 transmits a request for data specified by the URL to the backend apparatus 1 side (S20). In response to the request, the backend apparatus 1 receives the result of device control included in the URL (here, information indicating the completion of printing). The information regarding the result of the device control may be provided for subsequent processes. Specifically, for example, when a result of the device control indicates an error, the subsequent process is a process for transmitting delivery information which describes the information indicating the error, through the server 2, to the terminal 3, and the like.

As mentioned above, according to the present embodiment, as long as the terminal 3 is capable of performing processes to transmit information to the device, the device can be controlled, without installing a device driver or a control application dedicated for each device, in each terminal 3. Further, the result of the device control can be obtained at the backend apparatus 1, and thus, various processes can be performed at the backend apparatus 1.

Further, in the present explanation, a printer is referred to as an example of the device 4, but the device 4 is not limited to a printer. For example, the device 4 may be a card reader/writer or an IC chip reader. In this case, the device 4 reads information of the card or the IC chip, as a process based on the device control information which is received from the backend apparatus 1 through the server 2 and the terminal 3. Then, the device 4 transmits the read and obtained information to the terminal 3, as information indicating a result of operations. The terminal 3 transmits a request for delivery information including the received information, through the server 2, to the backend apparatus 1.

Further, the device 4 may be a GPS (Global Positioning System) device arranged in the terminal 3. In this case, the control unit 31 of the terminal 3 controls the GPS device on the basis of the device control information received from the server 2, and obtains position information, as information indicating a result of operations. Then, the terminal 3 transmits a request for delivery information including the obtained position information, through the server 2, to the backend apparatus 1.

Still further, the device 4 may be a camera arranged in the terminal 3. In this case, the control unit 31 of the terminal 3 activates the camera on the basis of the device control information received from the server 2. Then, the terminal 3 functions as a camera, and stands by for pressing of a shutter by a user. When the user presses the shutter, information of an image captured by an image capturing element at that time, is recorded in the terminal 3. The terminal 3 transmits a request for delivery information including the obtained information of the captured image, through the server 2, to the backend apparatus 1.

EXPLANATION ON NUMERALS

1 backend apparatus, 2 server, 3 terminal, 4 device, 11 web server unit, 12 backend processing unit, 21 client unit, 22 information transformation unit, 31 control unit, 32 storage unit, 33 display unit, 34 operation unit, 35 communication unit, 36 interface unit, 41 interpreter unit, 42 data input/output unit, 43 data holding unit, 44 device control unit, 45 device communication unit

The invention claimed is:

1. An information processing system comprising,
a server,
a backend apparatus, and
a terminal which is communicably connected to the server, and to a device to be control;
wherein
the server includes a circuitry configured to
receive screen description information relating to an input interface, from the backend apparatus,
execute transformation to a data format interpretable for the terminal, on the basis of the received screen description information,
transmit the information in the data format interpretable at the terminal side, to the terminal,
receive a parameter list of input values, from the terminal,
transmit a request of delivery information which includes device control information, and the parameter list of the input values to the backend apparatus, and
receive the device control information for controlling the device and the data input at the terminal, from the backend apparatus, and transmit the received device control information and the data input at the terminal to the terminal; and
the terminal includes
an interface unit connected to the device, and
a circuitry configured to
receive the screen description information relating to the input interface from the server,
receive the input values by a user operation,
receive the device control information and the input values transmitted, through the server, from the backend apparatus,
add the data input at the terminal which is received from the backend apparatus to the device control information received from the backend apparatus, and
transmit the received device control information with the input data added to the device through the interface unit.

2. A terminal communicably connected to a server and a device to be controlled,
the terminal including
an interface unit connected to the device, and
a circuitry configured to
receive information defining an input interface, from the server, and present the input interface to a user, on the basis of the received information,
send input values to a backend apparatus via the server,
receive device control information for controlling the device, and the data input at the terminal, from the server,
add the data input at the terminal which is received from the backend apparatus to the device control information received from the backend apparatus, and
execute device communication by transmitting the received device control information and the received data with the input values added to the device through the interface unit.

3. A non-transitory computer readable medium storing a program which causes a computer, communicably connected to a server and connected via an interface unit to a device to be controlled, to execute steps of:
receiving information defining an input interface, from the server, and presenting the input interface to a user, on the basis of the received information, sending input values to a backend apparatus via the server,
receiving device control information for controlling the device, and the data input at terminal, from the server,
adding the data input at the terminal which is received from the backend apparatus to the device control information receive from the backend apparatus, and
executing device communication by transmitting the received device control information with the input value added to the device through the interface unit.

* * * * *